United States Patent [19]

Swarbrick et al.

[11] 4,117,195

[45] Sep. 26, 1978

[54] MANUFACTURE OF EXTRUDED PRODUCTS

[75] Inventors: Peter Swarbrick, Upton-by-Chester; William John Green, Pinner, both of England; Charles Maillefer, Lausanne, Switzerland

[73] Assignees: BICC Limited, London, England; Establissements Maillefer SA, Lausanne, Switzerland

[21] Appl. No.: 638,448

[22] Filed: Dec. 8, 1975 (Under 37 CFR 1.47)

[30] Foreign Application Priority Data

Dec. 6, 1974 [GB] United Kingdom ............... 52917/74

[51] Int. Cl.$^2$ ............................................. C08F 29/12
[52] U.S. Cl. ................ 428/379; 174/110 S; 260/827; 264/40.4; 264/40.7; 264/174; 264/211; 264/236; 264/331; 264/347; 264/349; 428/391
[58] Field of Search .................. 264/176 R, 174, 236, 264/347, 40.4, 40.7, 211, 349, 331; 260/827; 526/12, 279; 174/110 S; 428/379, 391

[56] References Cited

U.S. PATENT DOCUMENTS

| 3,121,914 | 2/1964 | Olson et al. | 264/211 |
| 3,155,750 | 11/1964 | Dahn, Jr. et al. | 264/40.7 |
| 3,646,155 | 2/1972 | Scott | 260/827 |
| 3,802,913 | 4/1974 | MacKenzie | 428/389 |
| 3,957,719 | 5/1976 | MacKenzie | 264/174 |
| 3,960,802 | 6/1976 | Beers et al. | 264/349 |

FOREIGN PATENT DOCUMENTS 964,428 7/1964 United Kingdom ............... 264/176 R Primary Examiner—Jeffery R. Thurlow
Attorney, Agent, or Firm—Buell, Blenko & Ziesenheim

[57] ABSTRACT

In a method of making a cross-linked extruded product from polyethylene or other suitable polymer, the polymer is metered into a screw extrusion machine together with compounding ingredients comprising a hydrolysable unsaturated silane, a free-radical generator and a silanol condensation catalyst. The compounding ingredients are blended with the polymer in the barrel of the extruder and the mixture is heated sufficiently to effect grafting of silane groups to the polymer, the amount of free-radical generator being sufficiently low to limit direct free-radical cross-linking to a level that will not prevent extrusion of the material. The reaction mixture is extruded directly from the same extruder through an extrusion die to form an elongate shaped product and cross-linking is effected by subjecting the shaped product to the action of moisture.

17 Claims, No Drawings

MANUFACTURE OF EXTRUDED PRODUCTS

This invention relates to the manufacture of extruded products, especially but not exclusively electric cables and pipes, that are of carbon-chain polymers cross-linked by the use of hydrolysable unsaturated silane. Such products are formed by first reacting the polymer with the hydrolysable unsaturated silane in the presence of a free-radical generator, such as a peroxide, and afterwards exposing the grafted material to the effects of moisture and a silanol condensation catalyst. Suitable reagents have been described in the specification of British Pat. No. 1,286,460 and its U.S. counterpart 3,646,155, issued Feb. 29, 1972. It is now known, however, that the process is applicable to a variety of polymers other than polyethylene and the modified polyethylenes referred to in that specification, for example chlorinated polyethylenes and a wide range of olefin copolymers can be processed, and in the practice of the present invention the reaction conditions set forth need not in all cases be strictly adhered to.

Hitherto the manufacture of extruded products by the hydrolysable unsaturated silane cross-linking technique has been a three-stage process: first the grafted polymer is prepared, secondly it is shaped, and thirdly the shaped article is cured. Usually the catalyst is incorporated in the second stage, although it has been suggested that it could be introduced before or during the grafting reaction.

In accordance with the invention, a method of making a cross-linked extruded product comprises: metering into a screw extrusion machine polymer capable of being cross-linked by the use of hydrolysable unsaturated silane together with compounding ingredients comprising a hydrolysable unsaturated silane, a free-radical generator and a silanol condensation catalyst; blending the compounding ingredients with the polymer in the barrel of the said extruder and raising the temperature sufficiently to effect grafting of silane groups to the polymer, the amount of free-radical generator being sufficiently low (having regard to the other materials present and to other relevant conditions) to limit direct free-radical cross-linking to a level that will not prevent extrusion of the material; extruding the reaction mixture from the said extruder through an extrusion die to form an elongate shaped product; and cross-linking the grafted polymer in the shaped product by the action of moisture. The scrupulous exclusion of moisture from the materials fed to the extruder is not required, but, as in conventional extrusion processes, large amounts of water should not normally be present, and in particular cases a specific drying operation may be necessary. If required, cross-linking can be effected at a temperature below the softening point of the grafted polymer so as to avoid a risk of distortion.

Other compounding ingredients may be added, for example antioxidants, fillers and pigments.

For processing of olefin polymers, the preferred compounding ingredients are vinyl tri-methoxy silane, a peroxide that decomposes rapidly at the grafting temperature, and dibutyl tin dilaurate, but in suitable circumstances any of the alternative reagents listed in the said British Specification No. 1,286,460 and its U.S. counterpart 3,646,155, issued Feb. 29, 1972 may be used. Preferred peroxides are dicumyl peroxide and 1,3 bis(-tert.butyl peroxy isopropyl) benzene (sold under the trademark Perkadox 14).

Preferably the polymer and at least some of the compounding ingredients are metered into and premixed in the hopper of the extruder. Suitable apparatus is commercially available, for example from Colortronic Reinhard & Co. K - G of 6382 Friedrichsdorf/Taunus 2, Otto-Hahn-Strasse 18-20, German Federal Republic, and comprises a hopper with a central powered screw mixer and a number of digitally controlled metering devices; for metering solid materials a rotor having a series of metering chambers filled from above and discharging downwards at a separate station is controlled to rotate, usually discontinuously, at the required rate, whereas for liquids an adjustable diaphragm metering pump is used.

If the number of compounding ingredients required makes it necessary, or if desired, suitable compounding ingredients but not all of them may be pre-mixed with the polymer or with each other and metered as a mixture; for example peroxide may be fed as a masterbatch, or as a coating on particles of polymer or filler; the condensation catalyst may usually be dissolved in a liquid silane and metered as a solution; and some fillers that are difficult to disperse, notably conductive carbon black, may be better predispersed in the polymer or some of it. Provided that satisfactory mixing can be achieved, it may be desirable not to add certain ingredients, mostly liquids, to the top of the extruder hopper, but to inject them to the base of the hopper or direct to the throat of the extruder. This applies in particular to ingredients that evolve unpleasant vapour and/or cause the material to stick to the hopper equipment, notably many of the silanes.

The extruder itself has a single barrel with at least one screw extending from end to end of it; usually only one screw will be used, but may involve sections with different profiles, possibly including intermediate sections without helical flights (as for example in two stage vented extruders), and the use of intermeshing screws over part or of all of the length is not excluded. On the other hand the use of two or more screws in series is outside the scope of this application even if they operate in integrally connected barrels, except in the case in which the screws operate in the same barrel and are directly mechanically coupled to each other, rigidly or otherwise; in this connection attention is drawn to co-pending U.S. patent application Ser. No. 722,545 of Michael J. Poole filed Sept. 13, 1976. The extruder will ordinarily need to provide a premixing zone, a homogenising zone and a metering zone. Preferably the homogenising zone is of the kind, described and claimed in the Application Maillefer S A's British Pat. No. 964,428, in which the material to be extruded is forced over the flight of the extruder screw from a converging groove to another groove, not otherwise communicating with the converging groove, one advantage of this arrangement being that entrainment of insufficiently-softened particulate material is inhibited. When the three zones referred to are present, the grafting reaction will normally take place in the metering zone.

From the metering zone of the extruder the homogenised and grafted mixture passes to the extruder die, which will normally be mounted in a cross-head in the case of cable manufacture. The finished product can be cross-linked by exposure to water or a moist atmosphere at a suitable temperature, as in the known three-stage silane grafting technique.

The method of the invention avoids the need for two high-temperature processing steps and for storing moisture sensitive intermediates such as grafted polymer, whilst retaining the advantage of the silane grafting technique that the extruded product can be examined for dimensional accuracy in a very short period compared with vulcanising and chemical cross-linking methods that involve high-temperature treatment of the extruded product under pressure to effect cross-linking. In addition, it has been found that a higher cross-link density can be achieved than is normally observed in the conventional three-step hydrolysable unsaturated silane technique; this may perhaps be associated with the elimination of ungrafted polymer conventionally used to masterbatch the catalyst.

In the following examples, where physical properties of extruded materials are specified, these are based on measurements in a typical actual test; the results obtained vary appreciably with the detailed design of the extrusion screw.

EXAMPLE 1

Polyethylene with a density of 0.918 and a melt flow index of 2, sold by Imperial Chemical Industries Ltd under the trademark Alkathene and reference No. WJG47 was fed to the hopper mixer of an extrusion machine together with the following metered amounts of additives (expressed in parts by weight per hundred parts of the polyethylene (phr):

| | |
|---|---|
| Carbon black MB | 2.5 |
| Dicumyl peroxide | 0.1 |
| (added as Perkadox BC40 which is 40% active peroxide but calculated on the basis of the actual peroxide content.) | |
| Vinyl trimethoxy silane (VTMOS) | 1.5 |
| Polymerised trimethyl dihydro-quinoline (sold under the trademark Flectol H) | 0.5 |
| Dibutyl tin dilaurate (DBDTL) | 0.05 |

The extruder screw had an overall length: diameter ratio of about 30:1 and provided a feed zone with a length of about 8 diameters in which the cross section of the passage slowly decreases, followed by a homogenising zone of the kind subject of British Pat. No. 964,428 occupying about six diameters in which, after an initial expansion, the material is forced over the flight of the screw from a rapidly-converging blind passage into a very slowly converging passage. This is followed by a slightly converging zone of about six diameters and finally a metering zone of uniform cross-section occupying the last ten diameters of the length of the screw.

The barrel of the extruder was maintained at a temperature of 130° C. up to and including the homogenising zones and part of the slightly converging section that follows it, and at 230° C. for the remainder of its length, including a cross-head by which the extruded material was applied to a wire. To ensure good drawdown a higher degree of vaccuum is needed at the point of the cross-head than would be the case for extrusion of ordinary thermoplastic polyethylene.

The insulation produced had the following typical properties after curing for 16 hours in water at 90° C.:

| | |
|---|---|
| Gel content | 77% |
| Ultimate tensile strength | 13 MN/m$^2$ |
| Elongation at break | 270% |
| Hot-set at 150° C and 0.2 MN/m$^2$: | |
| extension | 35% |
| set | −5% |

EXAMPLE 2

This was similar to Example 1 except that the peroxide was added in 98% active form and its level was reduced to 0.08 phr. Typical properties of the insulation product were:

| | |
|---|---|
| Gel content | 71% |
| Ultimate tensile strength | 12 MN/m$^2$ |
| Elongation at break | 350% |
| Hot set at 150° C and 0.2 MN/m$^2$: | |
| extension | 110% |
| set | +5% |

EXAMPLES 3–7

Example 3 was similar to Example 1 except that the peroxide and carbon black were masterbatched with a small amount of additional polyethylene.

Examples 4–7 were similar to Example 3 except that the DBTDL was replaced by the same weight of an alternative catalyst as follows: Example 4, dibutyltin dimaleate; Example 5, Stanclere T86; Example 6, Stanclere T186; and Example 7, Advastab T36 (the words Stanclere and Advastab being trademarks and the materials being available on the open market).

Typical properties of the insulation produced in these examples were as follows:

| Example | 3 | 4 | 5 | 6 | 7 | |
|---|---|---|---|---|---|---|
| Gel content | 73 | 70 | 70 | 68 | 69 | % |
| Ultimate Tensile strength | 16 | 15 | 17 | 14 | 15 | MN/m$^2$ |
| Elongation at Break | 380 | 530 | 580 | 380 | 440 | % |
| Hot Set: 150° C and 0.2 MN/m$^2$ — Elongation | 60 | 70 | 95 | 70 | 85 | % |
| Hot Set: 150° C and 0.2 MN/m$^2$ — Set | nil | nil | nil | nil | nil | % |

EXAMPLE 8

This was similar to Example 3 except that the VTMOS content was reduced to 1 phr.

Typical properties of the insulation produced were as follows:

| | |
|---|---|
| Gel content | 65% |
| Ultimate Tensile strength | 15 MN/m$^2$ |
| Elongation at break | 530% |
| Hot set: elongation | 110% |
| set | −5% |

EXAMPLES 10–12

These were similar to Example 1 except that the VTMOS content was raised to 2.0 phr in Examples 10 and 12, and carbon black omitted in Example 12 and the VTMOS content was raised to 2.5 phr in Example 11, the peroxide in Example 12 being added in the 96% active form sold under the trademark Perkadox SB.

Typical properties of the insulation produced were as follows:

| Example | 10 | 11 | 12 | |
|---|---|---|---|---|
| Gel Content | 81 | 79 | 78 | % |
| Ultimate Tensile Strength | 16 | 14 | 14 | MN/m² |
| Elongation at Break | 350 | 260 | 300 | % |
| Hot Set: 150° C and 0.2 MN/m² ( elongation | 55 | 25 | 35 | % |
| set | nil | −5 | −2.5 | % |

EXAMPLES 13–14

These were similar to Example 12 except that i) the peroxide content was increased to 0.15 phr and 0.265 phr respectively and (ii) the extrudate was produced in pipe form and (iii) cured for 6 hours in boiling water. Typical properties of the extruded material produced in these example were as follows:

| Example | 13 | 14 | |
|---|---|---|---|
| Gel Content | 83 | 83 | % |
| Vicat Penetration 140° C | 0.54 | 0.33 | mm |
| Ultimate Tensile Strength | 12.6 | 12.5 | MN/m² |
| Elongation at Break | 280 | 245 | % |
| Hot Set: 138° C and 0.2 MN/m² ( Elongation | 40 | 32 | % |
| Set | nil | nil | % |

Note: The Vicat test reported in this and subsequent examples is different from the British Standard Recommendation. A load of 100g weight was applied by a circular flat indenter with an area of 2 mm² and penetration measured after 10 minutes at 140° C.

EXAMPLE 15

This was similar to Example 14 except that the polyethylene was that sold as Alkathene XNM-68, having a density of 0.924 and a melt-flow index of 8. Typical properties of the extruded material were as follows:

| Gel Content | 79% |
|---|---|
| Vicat Penetration at 140° C | 0.56 mm |
| Yield Stress | 11 MN/m² |
| Ultimate Tensile Stress | 14 MN/m² |
| Elongation at Break | 265% |
| Hot Set: 138° C and 0.2 MN/m² ( Extension | 39% |
| Set | nil |

EXAMPLE 16

This was similar to Example 15 except that the polyethylene was that sold by Bakelite Xylonite Ltd as grade PN-220. This is supplied containing carbon black, the density of the material as purchased (which should be distinguished from that of the base polymer therein) being 0.930 and its melt flow index 0.12. Typical properties of the extruded material were as follows:

| Gel Content | 79% |
|---|---|
| Vicat Penetration 140° C | 0.45 mm |
| Yield Stress | 9.6 MN/m² |
| Ultimate Tensile Stress | 15 MN/m² |
| Elongation at break | 340% |
| Hot set: 138° C and 0.2 MN/m² ( extension | 41% |
| Set | 2½% |

EXAMPLES 17–18

Example 17 was similar to Example 16 except that the content of the peroxide was reduced to 0.15 phr. Example 18 was similar to Example 17 except that the content of peroxide, silane and catalyst were all reduced by half. Typical properties of the extruded material produced were as follows:

| Example | 17 | 18 | |
|---|---|---|---|
| Gel Content | 74 | 62 | % |
| Vicat Penetration 140° C | 1.1 | 1.7 | mm |
| Yield Stress | 9 | 10 | MN/m² |
| Ultimate Tensile Strength | 16 | 18 | MN/m² |
| Elongation at Break | 440 | 510 | % |
| Hot Set 138° C and 0.2MN/m² ( elongation | 63 | 70 | % |
| set | 2½ | 2½ | % |

EXAMPLE 19

This was similar to Example 11 except that the dicumyl peroxide was replaced by 0.25 phr of 1,3 bis(tert. butyl peroxy isopropyl) benzene, added as Perkadox 14/96, which has an activity of about 96% and that the insulation was cured for 6 hours in water at 100° C. Typical properties of the extruded material were as follows:

| Tensile Strength | 13.6 MN/m² |
|---|---|
| Elongation at Break | 215% |
| Gel Content | 84% |

What we claim as our invention is:

1. A method of making a cross-linked extruded product comprising:
   metering into a screw extrusion machine having a barrel and a screw extending from end to end thereof a polymer capable of being cross-linked by the use of a hydrolysable unsaturated silane together with proportionate amounts of compounding ingredients comprising a hydrolysable unsaturated silane, a free-radical generator and a silanol condensation catalyst, at least one of said compounding ingredients being metered separately from said polymer;
   blending said compounding ingredients with said polymer in a first zone of said barrel of said extruder to form a mixture and when blending is complete heating said mixture in a second zone of said barrel downstream of said first zone until silane groups have been grafted to said polymer, the amount of said free-radical generator being sufficiently low to limit direct free-radical cross-linking to a level that will not prevent extrusion of the material;
   extruding said mixture directly out of said extruder through an extrusion die to form an elongate product of a required final shape;
   and subjecting said elongate product to the action of moisture until said polymer therein is cross-linked.

2. A method as claimed in claim 1 in which said screw extrusion machine has in succession a premixing zone, a homogenizing zone in which said mixture is forced over a flight of said screw from a converging groove to another groove not otherwise communicating with said converging groove, said premixing and homogenising zones together constituting said first zone, and a metering zone comprising said second zone.

3. A method as claimed in claim 1 in which said elongate product is subjected to the action of moisture at a temperature below its softening point.

4. A method as claimed in claim 1 in which said polymer and at least one said compounding ingredient are metered into and premixed in a hopper forming the inlet of said extruder.

5. A method as claimed in claim 1 in which at least one said compounding ingredient is metered as a mixture with another ingredient.

6. A method as claimed in claim 1 in which said free-radical generator is a peroxide which is metered as a masterbatch with said polymer.

7. A method as claimed in claim 1 in which said free-radical generator is a peroxide which is metered as a coating on particles selected from said polymer and a filler.

8. A method as claimed in claim 1 in which a filler is metered as a predispersed mixture with at least some said polymer.

9. A method as claimed in claim 1 in which said condensation catalyst is metered as a solution in a liquid silane.

10. A method as claimed in claim 1 in which said polymer is polyethylene and said compounding ingredients comprise vinyl trimethoxy silane, a peroxide, and dibutyltin dilaurate.

11. A method as claimed in claim 10 in which said peroxide is dicumyl peroxide.

12. A method as claimed in claim 1 in which said peroxide is 1,3- bis(tert. butyl peroxy isopropyl) benzene.

13. A method as claimed in claim 1 in which said extrusion machine has a single screw.

14. An electric cable with cross-linked insulation made by the method claimed in claim 1.

15. A method as claimed in claim 1 wherein at least one said liquid compounding ingredient is injected to the base of a hopper of said extruder.

16. A method as claimed in claim 1 wherein at least one said compounding ingredient is injected direct into said barrel of the extruder.

17. A method as claimed in claim 1 in which each one of said silane, said free-radical generator and said catalyst is metered separately from said polymer.

* * * * *

REEXAMINATION CERTIFICATE (19th)

United States Patent [19]

Swarbrick et al.

[11] B1 4,117,195

[45] Certificate Issued Sep. 21, 1982

[54] MANUFACTURE OF EXTRUDED PRODUCTS

[75] Inventors: Peter Swarbrick, Upton-by-Chester; William John Green, Pinner, both of England; Charles Maillefer, Lausanne, Switzerland

[73] Assignees: BICC Limited, London, England; Establissements Maillefer SA, Lausanne, Switzerland

Reexamination Request
No. 90/000,009, Jul. 1, 1981

Reexamination Certificate for:
Patent No.: 4,117,195
Issued: Sep. 26, 1978
Appl. No.: 638,448
Filed: Dec. 8, 1975
(Under 37 CFR 1.47)

[30] Foreign Application Priority Data
Dec. 6, 1974 [GB] United Kingdom.................52917/74

[51] Int. Cl.$^3$ .............................................. C08F 255/02
[52] U.S. Cl. ....428/379; 174/110 S; 264/40.4; 264/40.7; 264/174; 264/211; 264/236; 264/331.17; 264/347; 264/349; 428/391; 525/288
[58] Field of Search........... 264/211, 174, 349, 264/171

[56] References Cited

U.S. PATENT DOCUMENTS

| | | | |
|---|---|---|---|
| 3,121,914 | 2/1964 | Olson et al........................ | 425/208 |
| 3,155,750 | 11/1964 | Dahn, Jr. et al.................. | 264/40.7 |
| 3,646,155 | 2/1972 | Scott................................ | 260/827 |

FOREIGN PATENT DOCUMENTS

| | | |
|---|---|---|
| 2,353,783 | 5/1974 | Fed. Rep. of Germany. |
| 2,406,844 | 8/1974 | Fed. Rep. of Germany. |
| 964,428 | 7/1964 | United Kingdom. |
| 1,234,034 | 6/1971 | United Kingdom. |
| 1,396,120 | 6/1975 | United Kingdom. |
| 1,450,934 | 9/1976 | United Kingdom. |

*Primary Examiner*—Jeffery R. Thurlow

[57] ABSTRACT

In a method of making a cross-linked extruded product from polyethylene or other suitable polymer, the polymer is metered into a screw extrusion machine together with compounding ingredients comprising a hydrolysable unsaturated silane, a free-radical generator and a silanol condensation catalyst. The compounding ingredients are blended with the polymer in the barrel of the extruder and the mixture is heated sufficiently to effect grafting of silane groups to the polymer, the amount of free-radical generator being sufficiently low to limit direct free-radical cross-linking to a level that will not prevent extrusion of the material. The reaction mixture is extruded directly from the same extruder through an extrusion die to form an elongate shaped product and cross-linking is effected by subjecting the shaped product to the action of moisture.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–17 is confirmed.

* * * * *